UNITED STATES PATENT OFFICE.

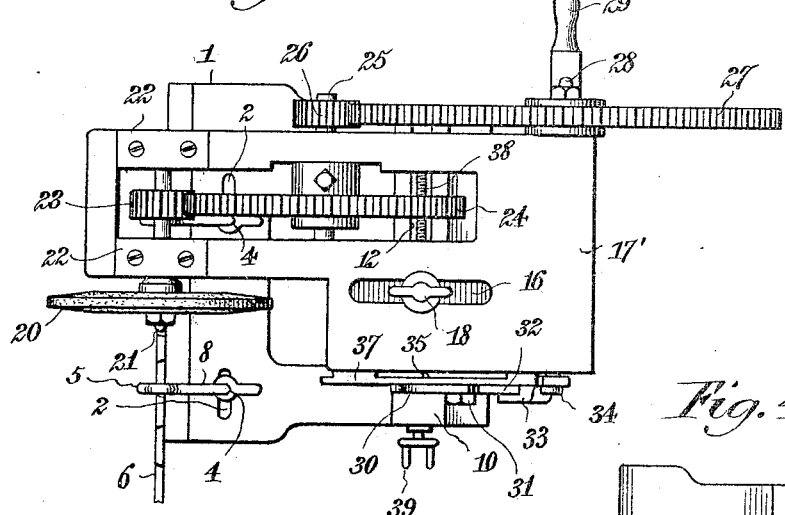
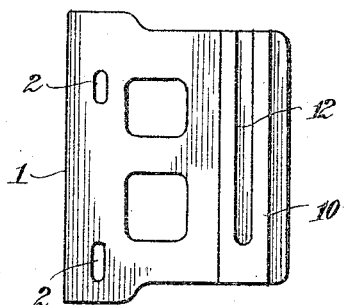
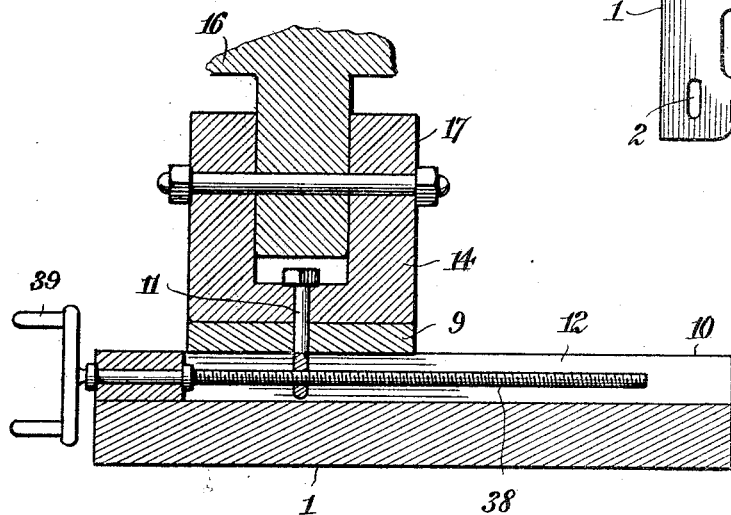

WILLIAM F. COUGHENOUR, OF SCOTTDALE, PENNSYLVANIA.

SAW-SHARPENING MACHINE.

1,210,275. Specification of Letters Patent. Patented Dec. 26, 1916.

Application filed November 6, 1914. Serial No. 870,662.

*To all whom it may concern:*

Be it known that I, WILLIAM F. COUGHENOUR, a citizen of the United States, residing at Scottdale, in the county of Westmoreland and State of Pennsylvania, have invented new and useful Improvements in Saw-Sharpening Machines, of which the following is a specification.

This invention relates to saw sharpening machines the object of the invention being to produce a practical, convenient and accurate machine for sharpening and gumming saws, particularly of the circular rotary type, enabling each and every tooth of the saw to be sharpened in the same manner and with the same pitch, whether said saw be of the cross cut or cut-off or rip type. The saw sharpening machine of this invention is also adapted to sharpen saws without the necessity of removing the latter from their arbors or mandrels and enables an inexperienced person to properly sharpen a saw with the skill of an expert.

With the above and other objects in view, the invention consists in the novel construction, combination and arrangement of parts, as herein described, illustrated and claimed.

Figure 1:
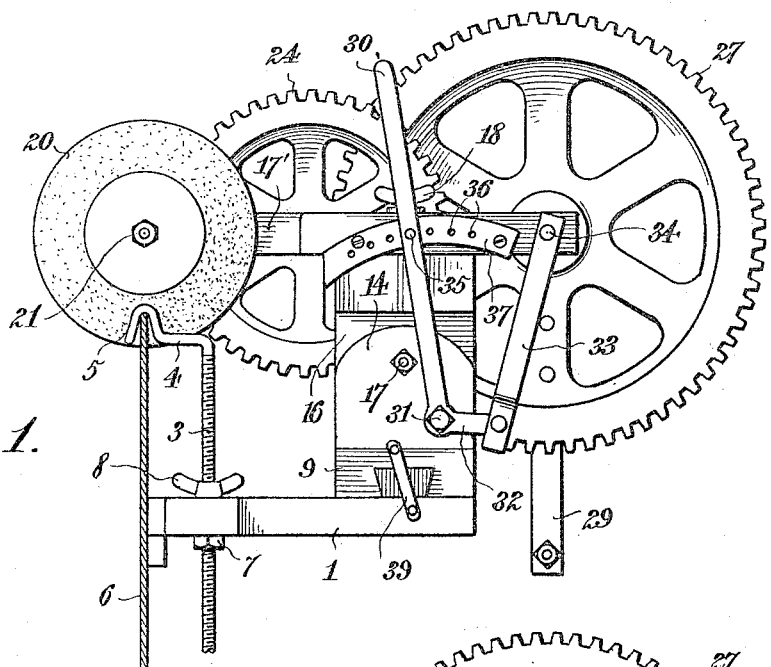
Figure 2:
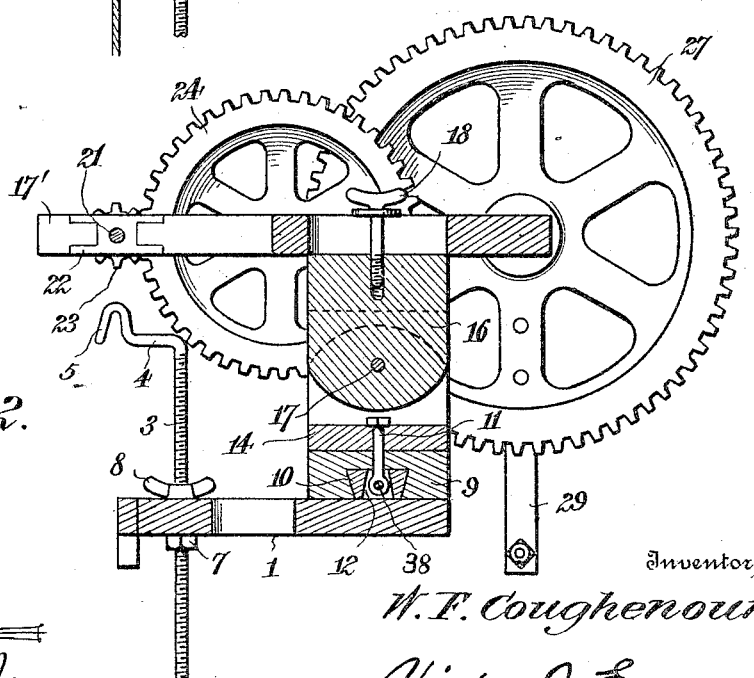

In the accompanying drawings, Figure 1 is a side elevation of a saw sharpening machine embodying the present invention, showing a fragment of a saw in cross section. Fig. 2 is a central vertical section through the same taken at right angles to the saw blade. Fig. 3 is a plan view of the machine. Fig. 4 is a plan view of the base. Fig. 5 is a fragmentary vertical section taken lengthwise of the head adjusting screw.

The saw sharpening machine contemplated in this invention comprises essentially a base 1 which is provided on that side adjacent to the saw blade with slots 2, said slots receiving a pair of hangers or supports 3 provided at their upper extremities with laterally extending arms 4 terminating in hooks 5 adapted to lie between the teeth of the saw blade indicated at 6 for the purpose of supporting the base 1 upon the saw blade. Each of the hangers 3 is threaded and provided with a nut 7 to allow for adjusting the base 1 relatively to the saw blade and is also provided with a clamping nut 8 shown of the winged type.

The construction just described permits the base to be raised and lowered to vary the distance thereof from the toothed edge of the saw blade, and also permits the hangers to be adjusted toward and away from each other so that the hooks thereof may lie in the desired spaces between the saw teeth.

9 designates a head which is mounted to slide on a dove tail guide 10 on the upper face of the base 1. The guide 10 is provided in its upper face with an undercut groove 12 extending longitudinally thereof and receiving the internally threaded eye of an eye bolt 11 extending downwardly from the slidable head or knuckle 14 to which is pivotally connected another knuckle 16 by means of a bolt or pin 17. Supported on the upper knuckle 16 is a tilting frame 17' which is adjustable by means of a clamping bolt 18 on top of the knuckle 16, the bolt 18 passing through a slot 19 in the tilting frame 17', which enables said frame 17' and the sharpening wheel hereinafter described to be adjusted back and forth to bring said wheel into the desired relation to the saw teeth.

20 designates a sharpening disk or emery wheel which is mounted upon a rotary arbor 21 journaled in bearings 22 on the tilting frame 17', the arbor 21 also having fast thereon a pinion 23 which meshes with and is driven by a spur gear wheel 24. On the same shaft 25 with the gear wheel 24 is another pinion 26 which meshes with and is driven by a large spur gear wheel 27. This wheel 27 is journaled on a stub shaft 28 extending from one side of the frame 17' and provided with an operating hand crank 29. By means of the gearing just described, the sharpening wheel 20 may be revolved at high speed when in contact with a saw tooth.

The means for tilting the frame 17' comprises a hand lever 30 pivotally mounted at 31 on the lower knuckle 14 and having a short arm 32 to which is pivotally connected a link 33 the opposite end of which is pivotally connected at 34 to the tilting frame 17' adjacent to the rear end thereof as shown in Fig. 1. The lever 30 is provided with a pin 35 adapted to enter any one of a series of holes 36 in a rack bar 37 secured to the adjacent side of the tilting frame 17. This enables the tilting frame to be held in any desired position while the sharpening wheel 20 is at work. By means of the lever 30 the sharpening wheel may be moved away from the saw teeth. The means for adjusting the slidable head on which the tilting frame is supported, consists of a feed screw 38 provided with an operating head 39 at one end, said screw engaging the eye bolt 11 carried by the slidable knuckle 14 so that when the screw is turned, the knuckle is slid lengthwise of the guide 10 so as to adjust or feed the sharpening wheel to its work.

The machine hereinabove described is light and for that reason may be supported directly on a circular saw, for example, and adjusted so as to bring the cutting or sharpening element of the machine into the proper relation to the saw teeth. The machine is bodily shifted from time to time along the teeth of the saw so that all of the teeth may be correspondingly and accurately sharpened or ground by means of the sharpening wheel which as above stated preferably consists of an emery disk.

What I claim is:—

1. In a saw sharpening machine, a base, a plurality of hook shaped hangers for supporting said base on a saw blade, means adjustably connecting said hangers to the base to permit the base to be moved in a plane parallel to the saw blade for varying the distance between the base and the saw teeth, and saw sharpening means carried by said base and comprising a rotary sharpening member and driving means therefor.

2. In a saw sharpening machine, a base, a plurality of hook shaped hangers for supporting said base on a saw blade, means adjustably connecting said hangers to the base to permit the base to be moved in a plane parallel to the saw blade for varying the distance between the base and the saw teeth, means permitting said hangers to be adjusted toward and away from each other, and saw sharpening means carried by said base and comprising a rotary sharpening member and driving means therefor.

In testimony whereof I affix my signature in presence of two witnesses.

WILLIAM F. COUGHENOUR.

Witnesses:
W. S. WILEY,
L. B. CRAIG.

Copies of this patent may be obtained for five cents each, by addressing the "Commissioner of Patents, Washington, D. C."